United States Patent
Sakamoto et al.

(10) Patent No.: US 6,284,215 B1
(45) Date of Patent: Sep. 4, 2001

(54) MANUFACTURING METHOD OF ACTIVE MATERIALS FOR THE POSITIVE ELECTRODE IN ALKALINE STORAGE BATTERIES

(75) Inventors: Hiroyuki Sakamoto; Hidekatsu Izumi, both of Neyagawa; Hirokazu Kimiya, Kyoto; Yoichi Izumi, Moriguchi; Isao Matsumoto, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/560,296

(22) Filed: Apr. 27, 2000

Related U.S. Application Data (62) Division of application No. 09/017,029, filed on Feb. 2, 1998, now Pat. No. 6,129,902.

(30) Foreign Application Priority Data

Feb. 3, 1997  (JP) .................................................. 9-020182
Jul. 7, 1997  (JP) .................................................. 9-197719

(51) Int. Cl.$^7$ .......................... C01G 49/00; C01G 51/00; C01G 53/00; C01G 37/14; H01M 10/32

(52) U.S. Cl. .......................... 423/594; 423/595; 423/596; 423/598; 423/599; 423/600; 429/219; 429/220; 429/221; 429/222; 429/223; 429/224; 429/229; 429/231.5; 502/305; 502/306; 502/307; 502/308; 502/309; 502/310; 502/311; 502/312; 502/314; 502/315; 502/316; 502/317; 502/318; 502/324; 502/340; 502/343; 502/344; 502/345; 502/347; 502/349

(58) Field of Search ................................... 423/594, 595, 423/596, 598, 599, 600; 429/219, 220, 221, 222, 223, 224, 229, 231.5; 502/305, 306, 307, 308, 309, 310, 311, 312, 314, 315, 316, 317, 318, 324, 340, 343, 344, 345, 347, 349, 350, 352, 353, 355

(56) References Cited

U.S. PATENT DOCUMENTS 3,783,505 * 1/1974 Schoen, Jr. .............................. 29/609
3,840,407 * 10/1974 Yao et al. ........................ 136/120 FC (List continued on next page.)

FOREIGN PATENT DOCUMENTS 0462889  12/1991  (EP) .

(List continued on next page.)

OTHER PUBLICATIONS

Patent Abstracts of Japan—vol. 12, No. 414 (E–677), Nov. 2, 1988 & JP 63 152866 A (Yuasa Battery Co Ltd), Jun. 25, 1988 *abstract*.

(List continued on next page.)

*Primary Examiner*—Steven P. Griffin
*Assistant Examiner*—Cam N. Nguyen
(74) *Attorney, Agent, or Firm*—Stevens, Davis, Miller & Mosher, LLP (57) ABSTRACT

A process for producing positive electrode active material includes feeding an aqueous nickel salt solution, aqueous solutions of different kinds of metals, aqueous solution containing ammonium ions and aqueous alkali solution each independently and simultaneously into a reaction vessel such that the amount of alkali metal is 1.9–2.3 moles relative to 1 mole of the total amount of nickel and different kinds of metals and the amount of ammonium ions is 2 moles or more relative to 1 mole of the total amount of nickel and different kinds of metals, the pH in the vessel is 11–13, the temperature in the vessel is 30–60° C. and the average residence time is 20–50 hours. Further, in the process step of continuously growing the complex metal oxide particles from the salts of a plurality of metal elements through a plurality of successive reaction-deposition stages, the compositions and/or the kinds of the salts of metal element groups used for forming the oxide in the reaction-deposition stages adjacent to each other are made to be different from each other.

7 Claims, 3 Drawing Sheets

U.S. PATENT DOCUMENTS

| | | |
|---|---|---|
| 3,867,199 | 2/1975 | Dunlop et al. . |
| 3,894,885 | 7/1975 | Turner et al. . |
| 3,972,729 | 8/1976 | Mosetti et al. . |
| 4,064,332 | 12/1977 | Elfwing et al. . |
| 4,202,789 | 5/1980 | Saridakis . |
| 4,251,603 | 2/1981 | Matsumoto et al. . |
| 4,275,126 * | 6/1981 | Bergmann et al. ............ 429/30 |
| 4,603,094 | 7/1986 | Yasuda . |
| 4,931,419 * | 6/1990 | Blanchard et al. ............ 502/304 |
| 4,938,780 | 7/1990 | Kaiya et al. . |
| 5,023,155 | 6/1991 | Charkey et al. . |
| 5,118,475 * | 6/1992 | Cornelison ............ 422/174 |
| 5,348,822 | 9/1994 | Ovshinsky et al. . |
| 5,366,831 | 11/1994 | Watada et al. . |
| 5,455,125 | 10/1995 | Matsumoto et al. . |
| 5,498,403 | 3/1996 | Shin . |
| 5,523,182 | 6/1996 | Ovshinsky . |
| 5,569,444 | 10/1996 | Blanchard et al. . |
| 5,569,562 | 10/1996 | Glemser et al. . |

FOREIGN PATENT DOCUMENTS

| | | |
|---|---|---|
| 0727835 | 8/1996 | (EP) . |
| 0738017 | 10/1996 | (EP) . |
| 2750255 | 12/1997 | (FR) . |
| 1122737 | 10/1976 | (JP) . |
| 6137733 | 2/1980 | (JP) . |
| 6254235 | 8/1981 | (JP) . |
| 480513 | 7/1985 | (JP) . |
| 326903 | 5/1986 | (JP) . |
| 350384 | 5/1986 | (JP) . |
| 8225328 | 9/1996 | (JP) . |
| 8236108 | 9/1996 | (JP) . |

OTHER PUBLICATIONS

Database EPODOC E.P.O. CN1107442 Aug. 30, 1995 Wang Weibo XP002064779.

Isao Matsumoto, et al., "Studies on the Utilization of Foamed Nikel Positive Plate," Denki Kagaku, vol. 54, No. 2, pp. 159–163 (1986).

I. Matsumoto, et al., "Foamed nickel Positive Electrode For a High Performance Cylindrical Ni–Cd Battery," Power Sources, vol. 12. pp. 203–220 (1988).

Isao Matsmoto, et al., "Studies on Charge Efficiency of Foamed Nickel Positive Plate," Denki Kagaku, vol. 54, No. 2, pp. 164–169 (1986).

Hiromichi Ogawa, et al., "Metal Hydride Electrode for High Energy Density Sealed Nickel–Metal Hydride Battery," Power Sources, vol. 12, pp. 393–410 (1988).

C. Delmas, et al., "Nickel Hydroxide and Derived Phases Obtained by Chimie Douce from $NaNiO_2$ ," Solid State Ionics 32/33, pp. 104–111 (1989).

C. Faure, et al., "Preparation and characterization of cobalt- –substituted α–nickel hydroxides stable in KOH medium Part I. α'-Hydroxide with an ordered packing," Journal of Power Sources, 35, pp. 249–261 (1991).

Clive D.S. Tuck (Editor), "Modern Battery Technology," Ellis Horwood Series in Applied Science And Industrial Technology, pp. 244–245 (1991).

* cited by examiner

MANUFACTURING METHOD OF ACTIVE MATERIALS FOR THE POSITIVE ELECTRODE IN ALKALINE STORAGE BATTERIES

This is a division of application Ser. No. 09/017,029, filed Feb. 2, 1998, U.S. Pat. No. 6,129,902 issued Oct. 10, 2000.

BACKGROUND OF THE INVENTION

The present invention relates to a process for producing a positive electrode active material for alkaline storage batteries.

With the progress of semiconductor technologies in recent years, commercialization of electronic equipment with reduced size, lighter weight and more multifunctions is advancing, and the personal use of small-sized portable equipment, typically represented by portable telephones and notebook-sized personal computers is progressing rapidly. Consequently, the requirement for alkaline storage batteries, which are in wide use as the power source of such equipment, with smaller size and lighter weight is also becoming increasingly strong.

To date, the main active material used for the positive electrode of alkaline storage batteries is. nickel oxide (NiOOH); as to the electrode substrate, an electrode comprising a three dimensional foamed nickel porous body with higher porosity (95%) and nickel oxide powder filled in high density thereinto (foamed metal type electrode) has been industrialized (for example, JP-B-62-54235 and U.S. Pat. No. 4,251,603) to replace the sintered-type electrode which uses the previous sintered substrate, and resultantly the energy density of nickel positive electrodes has greatly improved.

In attaining the high energy density of nickel positive electrode mentioned above, improvement in the process for producing nickel oxide powder of the active material was also one of the important technologies. The process for producing nickel oxide powder previously used comprises reacting an aqueous solution of alkali, such as sodium hydroxide, on an aqueous nickel salt solution to form a precipitate, then aging the precipitate to effect crystal growth, and pulverizing the large granules thus formed by mechanical means. This process has the disadvantages of complicated procedures and low filling density resulting from the irregular shape of powder particles. However, another process has been proposed, as shown in JP-B-4-80513, which comprises reacting ammonia on an aqueous nickel salt solution to form an ammonium complex of nickel and then making nickel hydroxide grow in an aqueous alkali solution; resultantly, a continuous production process has become adoptable to reduce the production cost, and additionally high density filling has become possible because the shape of particles thus obtained is close to spherical.

However, the paste-type electrode of this kind, which uses high density particles of large particle diameters grown to several ten $\mu$m as the active material, has the difficulty of decreased charge-discharge efficiency due to the decreased electric conductivity of the active material itself. To overcome the difficulty, the improvement of charge-discharge efficiency has been attempted by adding Co, its oxide, Ni, etc. to supplement the electric conductivity (JP-B-61-37733; Denki Kagaku (Electrochemistry), Vol. 54, No. 2, p. 159 (1986); Power Sources, 12 p. 203 (1988)) and further, with the intention of improving also the active material itself, by incorporating thereinto metal elements other than Ni, such as Co, as solid solution. The latter attempt to improve the charge-discharge efficiency by incorporating a different kind metal element to the inside of crystals as solid solution has hitherto used, as shown for example in JP-B-3-26903, JP-B-3-50384; Denki Kagaku (Electro-chemistry), Vol. 54, No. 2, p. 164 (1986); and Power Sources, 12, p. 203 (1988), the method of adding Cd and Co to the inside of the active material. For reasons of environmental issues, however, cadmium-free batteries are eagerly desired and Zn has been proposed as an example of metal elements for replacing cadmium and, further, solid solutions of such 3 elements as Co, Zn and Ba have been also proposed (U.S. Pat. No. 5,366,831). Such addition of different kinds of metals to nickel oxide to form a solid solution, intended for improving charge-discharge efficiency, is a long-standing technique and was already disclosed in, for example, JP-A-51-122737.

The improvement in the structure of substrates, the shape of active materials, the composition of active materials and the additives described above has greatly improved the energy density of positive electrodes, and at present positive electrodes with an energy density of about 600 mAh/cc have become practical. However, continual need for improving the energy density of batteries as the power source of small-sized portable equipment is increasingly strong. The improvement of energy density of batteries may conceivably be approached from such aspects as the positive and negative electrodes, electrolyte, separator and method of construction of these. With regard to the method of constructing a battery, a rapid increase in energy density has been attained by such technological progresses as the use of thin separators and high density filling of electrode plates, and the increase has nearly reached its limit at present. As to the negative electrode, the practical use of metal hydrides of high energy density (Power Sources, 12, p. 393 (1988)) in place of the previous cadmium negative electrode have brought a volume energy density of negative electrode two or more times that of positive electrode. Therefore, to attain a still greater increase in energy density of a battery, the improvement of the positive electrode is effective; that is, a still greater improvement in the energy density of the positive electrode, which occupies nearly the half the volume of a battery, has become indispensable.

Improvement in the energy density of the positive electrode may conceivably be approached by improvement in the electrode filling density, for example, improvement in the tap density of active materials, decrease in the amount of additives and decrease in the amount of metal of the foamed nickel substrate, but these techniques are approaching nearly to their limits. Therefore, it is necessary to aim at modifying the active material itself, improving the reactivity and improving the order of reaction. It is generally considered that the nickel oxide of the positive electrode active material used at present is in the form of β-type $Ni(OH)_2$ (di-valent oxide) at the time of filling and, in usual charge and discharge, a one-electron reaction (utilization: 100%) proceeds between it and the β-type NiOOH (tri-valent). However, the β-NiOOH at the charged state is oxidized by overcharge partly to a higher order oxide, γ-NiOOH (3.5–3.8-valent). Heretofore, various methods have been devised to suppress the formation of the γ-NiOOH because it not only causes voltage drop and capacity decrease owing to its electrochemical inactiveness but causes various additional troubles as imperfect contact of the electrode with the conducting agent and the substrate due to the volume expansion of the electrode caused by spreading of γ-NiOOH into the space between the layers formed by Ni—O, falling of the active material, and exhaustion of the electrolyte caused by the γ-NiOOH incorporating water molecules thereinto. However, in order that a high energy density may be attained by using an active material based on nickel oxide, it is essential to use the γ-NiOOH of the higher order oxide. Accordingly, materials of a structure similar to a-type hydroxide in which a part of Ni is replaced with a different kind metal, e.g., Mn(III), Al(III) and Fe(III), to form a solid solution, and anions and water molecules are incorporated between the layers have been proposed (for example, Solid State Ionics, 32/33, p. 104 (1989); J. Power Sources, 35, p. 249 (1991); U.S. Pat. No. 5,348,822 (1994), U.S. Pat. No. 5,569,562 (1996), and JP-A-8-225328). It is described that charge and discharge reactions readily proceed between this oxide and the higher order oxide of a structure similar to γ-NiOOH. Actually, however, the oxide has a wide interlayer space even at the discharged state and hence the material itself is very bulky, so that the oxide is conceivably difficult to fill in high density and difficult to use in practice. To solve these problems the present inventors have paid attention to an active material which has a β-type crystal structure at the time of electrode filling and which can make a charge-discharge reaction proceed between itself and the γ-NiOOH of the higher order oxide.

The present inventors have proposed various complex metal oxides which are sometimes referred to as multiple metal oxides. The complex metal oxides comprise nickel oxide containing a metal element other than nickel added to the inside of the crystals of the nickel oxide, but the complex metal oxides have various problems, including the lowering of charge efficiency and of charge-discharge voltage at high temperatures due to the lowering of oxygen overvoltage, and the lowering of chemical or electrochemical stability, depending on the kind of metals added and the composition of the oxides. Accordingly, the present inventors, from the necessity of improving the property of the interface between the active material and the electrolyte, are directing attention to an active material having a complex metal oxide layer coated thereon which has characteristic properties of ① a high charge efficiency at high temperatures, ② a high discharge voltage and ③ high chemical and electrochemical stabilities.

A process for producing a surface coating layer hitherto proposed is a batch type one which comprises first synthesizing the oxide of the inner layer, followed by water-washing and drying, and then growing the oxide of the surface layer in a separate deposition vessel. With regard to a process for producing nickel hydroxide coated with cobalt hydroxide, though it is intended for a material different from the above-mentioned oxide comprising mainly nickel, a process has been proposed wherein the coated nickel hydroxide is produced continuously by connecting a vessel for growing nickel hydroxide of the inner layer, a vessel for water-washing and a vessel for coating cobalt hydroxide, successively (Japanese Patent Application No. 7-40853). In this application, however, since it aims at coating cobalt hydroxide, a water-washing vessel is provided between the nickel hydroxide deposition vessel of the primary stage and the cobalt hydroxide deposition vessel.

A process hitherto proposed for producing a complex metal oxide containing Co, Zn and Cd added thereto as the metal other than Ni comprises mixing the respective predetermined amounts of a Ni salt and respective metal salts, dissolving the mixture in water to form an aqueous solution, reacting ammonia on the aqueous solution to form an ammonium complex, and then adding an aqueous alkali solution to the resulting reaction mixture to effect neutralization. In this case, since the amount of the different kind metals added is small, approximately the same conditions were adopted as in the process for producing nickel oxide for such conditions as reagent concentration, pH, temperature and residence time.

However, in cases where metals other than Ni in metal oxides are of many kinds or of a large amount, particles of uniform composition and high density were difficult to obtain because, depending on the kind of metal salt some metal salts may form salts of very low solubility when mixed with aqueous solutions of other metal salts or they may deposit as precipitates owing to the change of pH taking place when ammonium ions are reacted on the salts.

Furthermore, since the process for producing complex metal oxides which comprise nickel as the main metal element and have different compositions and kinds of constituents between the surface layer and the inner A first aspect of the present invention relates to a process for producing complex metal oxides using the first aqueous solution which is an aqueous Ni salt solution, the second aqueous solution containing one or more salts of at least one metal selected from Co, Zn and Cd, the third aqueous solution containing one or more salts of at least one metal selected from Mn, Al, V, Cr, Fe, Cu, Ge, Nb, Mo, Ag, W, Sn, Ca, Y, Ti, Sr, rare earth metals and Bi, the fourth aqueous solution which is an aqueous alkali solution and the fifth aqueous solution containing ammonium ions which process comprises preparing the respective solutions such that the amount of alkali metals in the fourth aqueous solution is 1.9–2.3 moles relative to 1 mole of the total amount of metal ions in the first, the second and the third aqueous solutions and the amount of ammonium ions in the fifth aqueous solution is 2 moles or more relative to 1 mole of the total amount of metal ions in the first, the second and the third aqueous solutions, then feeding the respective solutions prepared above simultaneously into a reaction vessel controlled at constant conditions within a pH range of 11–13 and a temperature range of 30–60° C., with stirring, so that the average residence time falls within the range of 20–50 hours, to obtain continuously a complex metal oxide having a desired particle diameter. The diameter of the particle is not limited, however preferably 2–100 µm, more preferably 5–20 µm. By feeding from the first to the fifth aqueous solution simultaneously, complex metal oxides with a uniform composition can be obtained, and by further selecting properly the ratio of reagent concentrations, pH, temperature and residence time, complex metal oxides with a high density can be obtained.

A second aspect of the present invention related to a process wherein all of the above-mentioned aqueous solutions are each independently prepared and then fed into the reaction vessel simultaneously. This process can prevent the formation of difficultly soluble salts which may be caused by mixing different kinds of metal salts at the time of preparation and the formation of precipitates which may be caused by metal salts reacting in advance with an alkaline solution, and consequently can give complex metal oxides with a uniform composition.

A third aspect of the present invention relates to a process wherein a mixed solution of the first aqueous solution with the fifth aqueous solution, a mixed solution of the second aqueous solution with the third aqueous solution, and the fourth aqueous solution are each independently prepared, and then simultaneously fed into the reaction vessel. An ammonium complex of nickel is formed by mixing an aqueous nickel salt solution with an aqueous ammonia solution, and the use of the solution of the ammonium complex permits the growth of the intended oxide to a high density. Further, by mixing aqueous solutions of different kind metals other than Ni, complex metal oxides with a more uniform composition and higher density can be obtained.

A fourth aspect of the present invention relates to a process for producing the complex metal oxide whose particles are formed of a plurality of layers comprising Ni as the main metal element piled up from the center toward the surface of the particle wherein, in the process of continuously growing the particles to a desired particle diameter through a plurality of successive reaction-deposition stages, the compositions and/or the kinds of the salts of metal groups for forming oxides in the reaction-deposition stages adjacent to each other are different from each other. By connecting a plurality of reaction-deposition stages and growing the complex metal oxide from aqueous solutions of salts of metal elements different in the composition and the kind between the respective stages, a plurality of layers of complex metal oxides different in the composition and the kind can be formed in the later stages on the surface of metal oxide particles which have grown in the initial stage. Moreover, the above-mentioned oxides can be formed continuously and the process steps can be simplified as compared with previous batch processes.

A fifth aspect of the present invention relates to a process wherein, in using a plurality of successive reaction-deposition stages and growing the complex metal oxides from aqueous solutions of salts of metal element different in the composition and the kind between the respective stages, the feeding method of the aqueous solutions, reagent concentration ratio, pH, temperature and residence time are adapted to the condition specified in the above-discussed first aspect. In this way, a uniform composition and high density can be attained in complex metal oxide particles formed of a plurality of layers comprising Ni as the main metal element piled up from the center toward the surface of the particle.

A sixth aspect of the present invention relates to a process wherein, among the plurality of reaction-deposition stages, the salts of group metal elements in the last stage contain, besides Ni salts, one or more salts of at least one metal selected from Ca, Ti, Zn, Sr, Y, Ba, Cd, Co, Cr, rare earth metals and Bi in a larger amount than in the preceding stage. In this way, a material containing in the surface layer a larger amount of the oxide of said metal element, which has the characteristic of increasing the oxygen generation overvoltage (i.e., improving the discharge efficiency), can be produced continuously and the process steps can be simplified.

A seventh aspect of the present invention relates to a process wherein, the salts of group metal elements in at least one stage which is prior to the last stage contain, besides Ni salts, one or more salts of at least one metal element selected from Al, V, Cr, Mn, Fe, Cu, Ge, Nb, Mo, Ag, Sn and W in an amount larger than in the last stage. In this way, a material containing in the inner layer a relatively large amount of the oxide of said metal element, which has the characteristics of, while expectedly improving the reactivity, causing voltage drop and being low in chemical and/or electrochemical stability, can be produced continuously and thus the process steps can be simplified.

An eighth aspect of the present invention relates to a process wherein the complex metal oxide is an oxide in the state of eutectic and/or solid solution of respective metals, whereby a high energy density can be attained.

One embodiment of the present invention is described below with reference to FIGS. 1 and 2.

Figure 1:
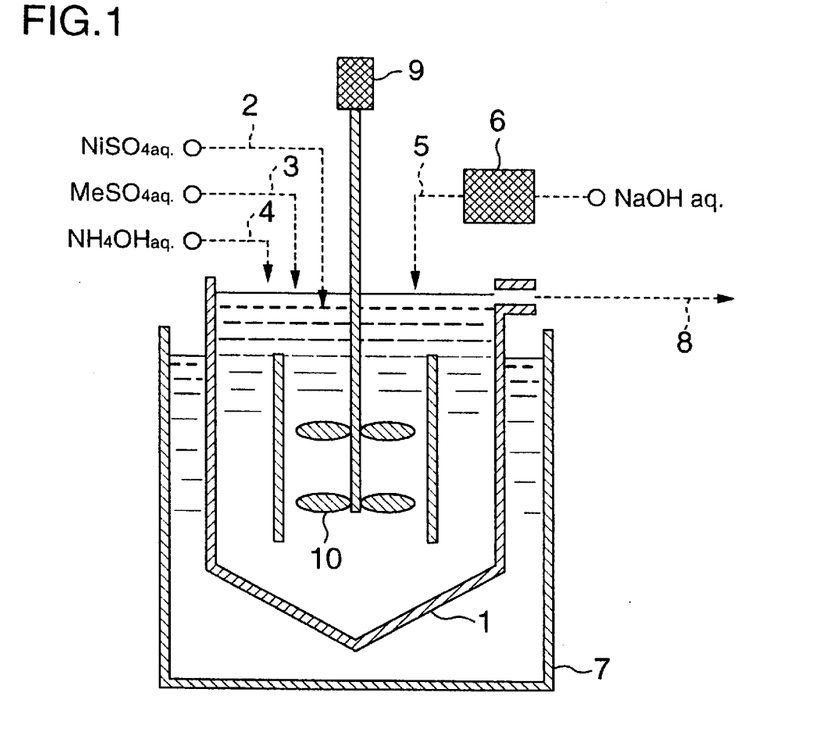
FIG. 1 is a schematic view showing an apparatus for producing an alkaline storage battery positive electrode active material according to one embodiment of the present invention (an embodiment in which only one reaction-deposition vessel is used).

FIG. 1 shows one example of the reaction apparatus used for practicing the present invention. To the reaction vessel 1 are introduced each independently an aqueous nickel salt solution feed line 2, an aqueous different kind metal salt feed line 3, an ammonium ion feed line 4 and an aqueous alkali solution feed line 5. The aqueous alkali solution feed line 5 is provided with a pH-stat 6 to regulate the flow of the aqueous alkali solution.

The aqueous different kind metal salt solution feed line 3 may consist independently of a line for feeding an aqueous solution of salts of Co, Zn and Cd and a line for feeding an aqueous solution of salts of Mn, Al, V, Cr, Fe, Cu, Ge, Nb, Mo, Ag, W, Sn, Ca, Y, Ti, Sr, rare earth metals and Bi.

The reaction vessel 1 is placed in a constant temperature vessel 7. The vessel 1 is provided at the upper part with a line 8 for taking out a liquid containing synthesized composite oxide particles and permits continuous taking out of the liquid by overflowing. The reaction vessel 1 is provided inside with a stirring blade 10 connected to a stirring apparatus 9 to keep the conditions in the reaction vessel 1 constant.

Figure 2:
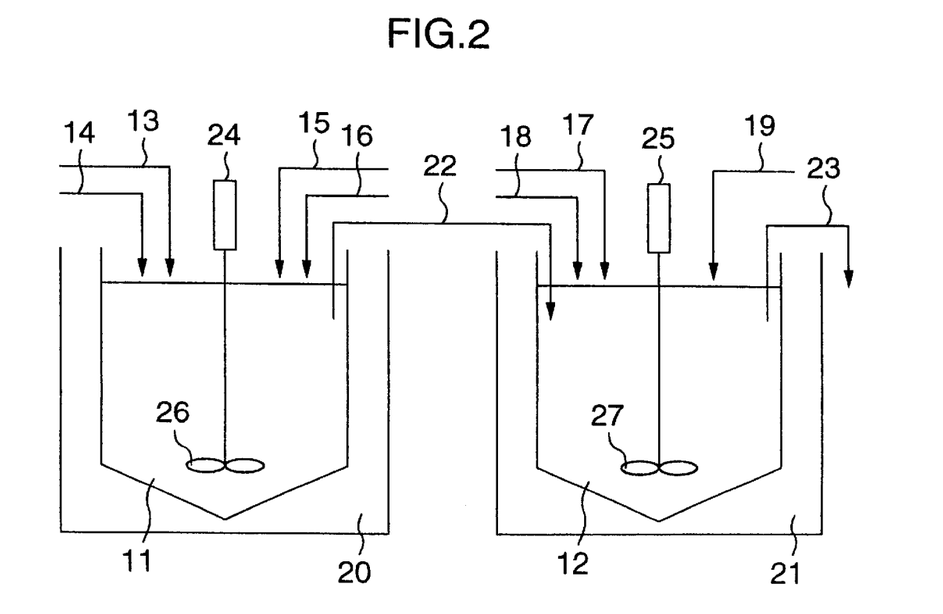
FIG. 2 is a schematic view showing an apparatus for producing an alkaline storage battery positive electrode active material according to another embodiment of the present invention (an embodiment in which two reaction-deposition vessels are connected).

FIG. 2 shows another example of the reaction apparatus used for practicing the present invention. To the reaction vessel 11 are introduced an aqueous nickel salt solution feed line 13, an aqueous different kind metal salt solution feed line 14, an ammonium ion feed line 15 and an aqueous alkali solution feed line 16. To the reaction vessel 12 are introduced an aqueous nickel salt solution feed line 17, a different kind metal salt feed line 18 and an aqueous alkali solution feed line 19. The aqueous alkali solution feed lines 16 and 19 are each provided with a pH-stat to keep the pH in the reaction vessel in a desired range by controlling the feed of aqueous alkali solution. The reaction vessels 11 and 12 are respectively placed in constant temperature vessels 20 and 21. The reaction system is designed such that the liquid in the former stage vessel can be continuously fed to the latter stage vessel through a slurry overflow line 22 and the complex metal oxide grown in the latter stage vessel can be continuously taken out at the same flow rate as the total feed flow rate of the aqueous solutions of the starting materials. A slurry which contains the synthesized composite oxide particles is taken out from a line 23. The reaction vessels 11 and 12 are respectively provided inside with stirring blades 26 and 27 respectively connected to stirring apparatuses 24 and 25, to keep the conditions in the reaction vessels constant.

Figure 4:
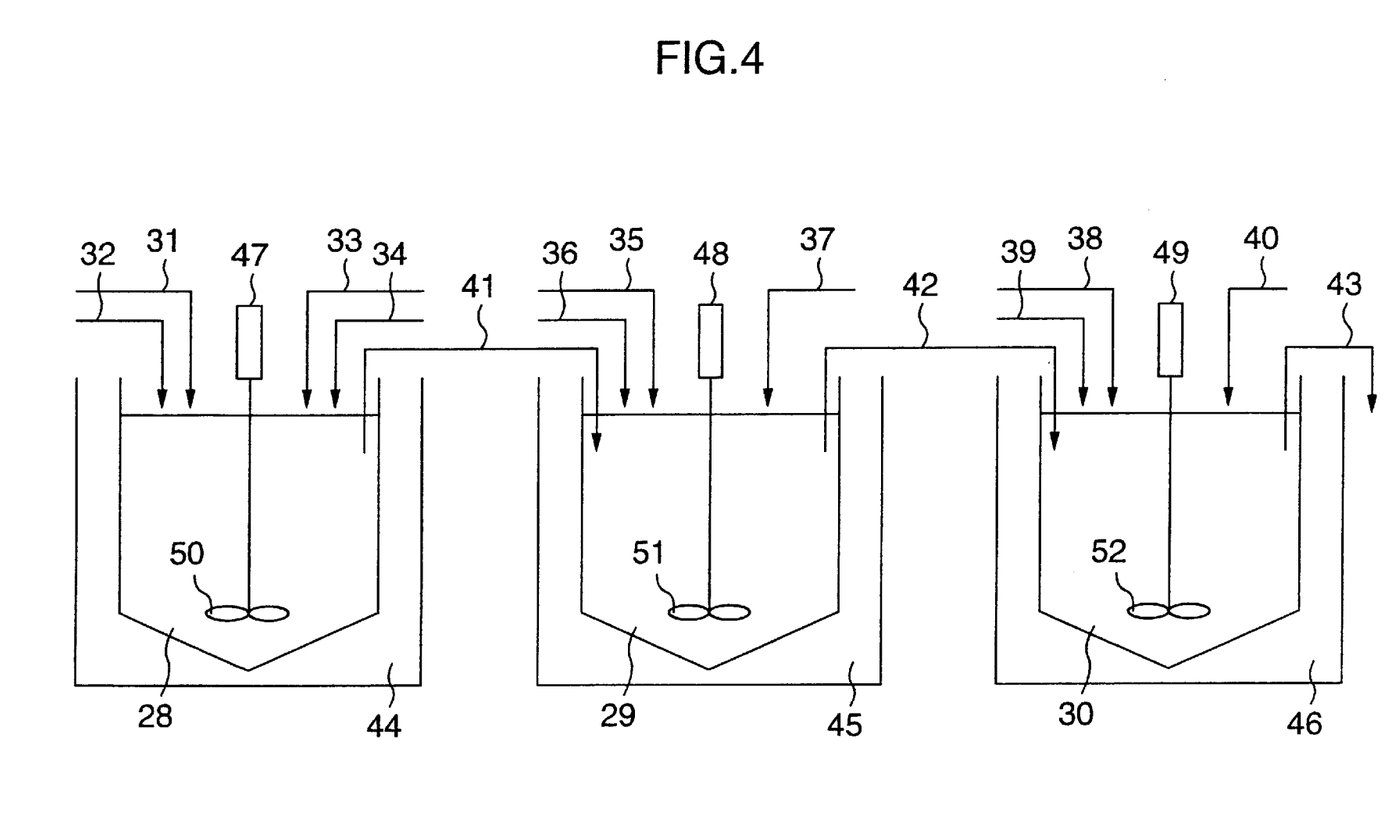
FIG. 4 is a schematic view showing an apparatus for producing an alkaline storage battery positive electrode active material according to still another embodiment of the present invention (an embodiment in which three reaction-deposition vessels are connected).

Though a structure of reaction system wherein the particles are grown through reaction-deposition vessels of two stages was shown above, a similar structure may be used for reaction vessels of 3 or more stages. For example, a structure having three reaction vessels is shown in FIG. 4. To the reaction vessel 28 are introduced an aqueous nickel salt solution feed line 31, an aqueous different kind metal salt solution feed line 32, an ammonium ion feed line 33 and an aqueous alkali solution feed line 34. To the reaction vessel 29 are introduced an aqueous nickel salt solution feed line 35, a different kind metal salt feed line 36 and an aqueous alkali solution feed line 37. To the reaction vessel 30 are introduced an aqueous nickel salt solution feed line 38, a different kind metal salt feed line 39 and an aqueous alkali solution feed line 40. The aqueous alkali solution feed lines 34, 37 and 40 are each provided with a pH-stat to keep the pH in the reaction vessel in a desired range by controlling the feed of aqueous alkali solution. The reaction vessels 28, 29 and 30 are respectively placed in constant temperature vessels 44, 45 and 46. The reaction system is designed such that the liquid in the former stage vessel can be continuously fed to the latter stage vessel through slurry overflow lines 41 and 42 and the complex metal oxide grown in the latter stage vessel can be continuously taken out at the same flow rate as the total feed flow rate of the aqueous solutions of the starting materials. A slurry which contains the systhesized composite oxide particles is taken out from a line 43. The reaction vessels 28, 29 and 30 are respectively provided inside with stirring blades 50, 51 and 52 respectively connected to stirring apparatuses 47, 48 and 49, to keep the conditions in the reaction vessels constant.

In the structure of the reaction system, besides the reaction-deposition vessels for growing the complex metal oxides, other vessels, e.g., vessels for the reaction of an aqueous solution containing ammonium ions, vessels for classification, and vessels for coating Co oxide as an conductive agent may also be connected.

EMBODIMENTS

Some embodiments of the present invention are described below with reference to the accompanying drawings.

EXAMPLE 1

A 2 mol/l aqueous nickel sulfate solution, 0.25 mol/l aqueous manganese sulfate solution, 0.1 mol/l aqueous zinc sulfate solution, 0.05 mol/l aqueous cobalt sulfate solution and 4.8 mol/l aqueous ammonia solution were prepared. Then, while being kept at 50° C., these solutions were simultaneously fed each at an average rate of 0.5 ml/min into a 5-l reaction vessel 1 and, while the inner temperature of the vessel being kept constant at 50° C. and with stirring to effect rapid and uniform mixing, a 4.8 mol/l aqueous sodium hydroxide solution was added at an average rate of 0.5 ml/min so as to keep the pH value in the reaction vessel within the range of 12.5±0.2.

The ratio of the respective aqueous solutions added herein was selected such that the amounts of sodium hydroxide and ammonia are respectively 2 moles relative to 1 mole of the total of the Ni, Mn, Co and Zn salts. Thus, a complex metal oxide comprising Ni, Mn, Co and Zn was formed, which was then continuously taken out from the upper part of the reaction vessel by means of overflowing, and samples for evaluation were collected after 30 hours of continuous operation. The residence time was about 28 hours.

The results of quantitative analysis showed that the molar ratio of Ni, Mn, Co and Zn in the complex metal oxide powder approximately coincided with the mixing ratio of the starting materials. The X-ray diffraction pattern showed no peak that indicates the presence of impurities, which suggested that the sample comprised crystals of uniform composition. Further, the SEM photograph confirmed that the sample comprised spherical particles with a high density and uniform particle diameter.

COMPARATIVE EXAMPLE 1

The same procedures as in Example 1 were followed except that no aqueous ammonia solution was added, to obtain samples for evaluation. The oxide powder thus obtained was found to form aggregates of a broad particle size distribution and irregular shape.

COMPARATIVE EXAMPLE 2

The same procedures as in Example 1 were followed except that the concentration of the aqueous sodium hydroxide solution was changed to 4.3 mol/l (about 1.8 moles of sodium hydroxide relative to 1 mole of metal salts) and the pH value was changed to 10.5, to obtain samples for evaluation. The complex metal oxide obtained was found to comprise very bulky particles with a wide particle size distribution.

COMPARATIVE EXAMPLE 3

The same procedures as in Example 1 were followed except that the concentration of the aqueous sodium hydroxide solution was changed to 6.0 mol/l (about 2.5 moles of sodium hydroxide relative to 1 mole of metal salts) and the pH value was changed to 13.5, to obtain samples for evaluation. The complex metal oxide obtained was found to form aggregates of minute particles.

COMPARATIVE EXAMPLE 4

The same procedures as in Example 1 were followed except that the concentration of the aqueous ammonia solution was changed to 4.3 mol/l (about 1.8 moles of ammonium ion relative to 1 mole of metal salts), to obtain samples for evaluation. The complex metal oxide particles obtained were found to be bulky particles with an irregular shape.

COMPARATIVE EXAMPLE 5

The same procedures as in Example 1 were followed except that the temperature in the vessel was changed to 20° C., to obtain samples for evaluation. The complex metal oxide particles obtained were spherical particles with a uniform particle diameter, but they had many voids and were very bulky.

COMPARATIVE EXAMPLE 6

The same procedures as in Example 1 were followed except that the temperature in the vessel was changed to 80° C., to obtain samples for evaluation. The complex metal oxide obtained comprised aggregates of minute particles.

COMPARATIVE EXAMPLE 7

The same procedures as in Example 1 were followed except that the feed amount was controlled so as to give a residence time of 15 hours, to obtain samples for evaluation. The complex metal oxide particles obtained had small particle diameters as a whole. The particles were composed mainly of curved surfaces, and were roundish as a whole but not spherical.

COMPARATIVE EXAMPLE 8

The same procedures as in Example 1 were followed except that the feed amount was controlled so as to give a residence time of 60 hours, to obtain samples for evaluation. The complex metal oxide particles obtained had big particle diameters as a whole, and the whole surface of the particles had cracks.

The characteristic properties of the complex metal oxide powders obtained in Example 1 and Comparative Examples 1, 2, 3, 4, 5, 6, 7 and 8 are shown in Table 1. As is apparent from Table 1, the Ni—Mn—Zn—Co complex metal oxide powder of the Example showed a higher tap density than the complex metal oxide powders of Comparative Examples.

TABLE 1

| Evaluation Sample | Tap Density (g/cm$^3$) | Average Particle Diameter ($\mu$m) |
| --- | --- | --- |
| Example 1 | 1.90 | 11.5 |
| Comparative Example 1 | 0.85 | 4.6 |
| Comparative Example 2 | 1.12 | 8.5 |
| Comparative Example 3 | 1.39 | 6.5 |
| Comparative Example 4 | 0.88 | 5.2 |
| Comparative Example 5 | 0.92 | 12.0 |
| Comparative Example 6 | 1.54 | 6.5 |
| Comparative Example 7 | 1.71 | 4.7 |
| Comparative Example 8 | 1.78 | 20.3 |

EXAMPLE 2

The same procedure as in the process for

The same procedures as in the process for producing the Ni—Mn—Zn—Co metal oxide shown in Example 1 were followed except that, in place of (a) Mn used in Example 1, (b) Al, (c) V, (d) Cr, (e) Fe, (f) Cu, (g) Ge, (h) Nb, (i) Mo, (j) Ag, (k) W, (l) Sn, (m) Ca, (n) Y, (o) Ti, (p) Sr, (q) La or (r) Bi was added, to obtain complex metal oxides. The complex metal oxides thus obtained were confirmed to be spherical particles with a uniform composition, high density and uniform particle diameter like the particles of Example 1.

The tap densities and the average particle diameters of the complex metal oxides obtained are shown in Table 2. As is apparent from the Table, all of the samples showed a high tap density of 1.9 g/cm$^3$ or more.

TABLE 2

| Evaluation Sample | Tap Density (g/cm$^3$) | Average Particle Diameter ($\mu$m) |
| --- | --- | --- |
| a | 1.90 | 11.5 |
| b | 1.92 | 10.6 |
| c | 1.90 | 10.2 |
| d | 1.95 | 11.8 |
| e | 1.94 | 11.7 |
| f | 2.02 | 12.1 |
| g | 2.00 | 11.8 |
| h | 1.91 | 10.5 |
| i | 1.93 | 11.8 |
| j | 1.90 | 10.7 |
| k | 1.92 | 11.1 |

TABLE 2-continued

| Evaluation Sample | Tap Density (g/cm$^3$) | Average Particle Diameter ($\mu$m) |
| --- | --- | --- |
| l | 1.94 | 11.5 |
| m | 2.01 | 12.1 |
| n | 1.95 | 11.5 |
| o | 1.90 | 10.2 |
| p | 2.03 | 12.0 |
| q | 1.92 | 10.3 |
| r | 1.92 | 10.3 |

EXAMPLE 3

A mixed aqueous solution having an ammonium concentration of 4.8 mol/l and a nickel sulfate concentration of 2 mol/l was prepared. The mixed solution, an aqueous solution of 0.25 mol/l of manganese sulfate and 0.1 mol/l of zinc sulfate, and a 0.05 mol/l aqueous cobalt sulfate solution were fed each independently and simultaneously into a 5-l reaction vessel each at an average rate of 0.5 ml/min while the aqueous solutions being kept at 50° C. While the inner temperature of the vessel being kept constant at 50° C. and with stirring to effect rapid and uniform mixing, a 4.8 mol/l aqueous sodium hydroxide solution was added at an average rate of 0.5 ml/min so as to keep the pH value in the reaction vessel within the range of 12.5±0.2. The addition ratio of the above-mentioned aqueous solutions were selected such that the amounts of sodium hydroxide and ammonia were each to be 2 moles relative to 1 mole of the total of the Ni, Mn, Co and Zn salts.

In this manner, a complex metal oxide comprising Ni, Mn, Co and Zn was formed, which was continuously taken out of the upper part of the reaction vessel by means of overflowing, and a sample was collected for evaluation after 30 hours of continuous operation. The residence time was about 33 hours. As in Example 1, the complex metal oxide obtained was confirmed to comprise spherical particles with a uniform composition, high density and uniform particle diameter.

COMPARATIVE EXAMPLE 9

A mixed aqueous solution having an ammonium concentration of 4.8 mol/l, a nickel sulfate concentration of 2 mol/l, a manganese sulfate concentration of 0.25 mol/l, a zinc sulfate concentration of 0.1 mol/l and a cobalt sulfate concentration of 0.05 mol/l was prepared. Then, while being kept at 50° C., the mixed solution was fed into a 5-l reaction vessel at an average rate of 0.5 ml/min. While the inner temperature of the vessel being kept constant at 50° C. and with stirring to effect rapid and uniform mixing, a 4.8 mol/l aqueous sodium hydroxide solution was added at an average rate of 0.5 ml/min so as to keep the pH value in the reaction vessel within the range of 12.5±0.2.

However, subsequent steps were difficult to operate because, on reacting ammonia on the aqueous metal oxide solution, zinc oxide and manganese oxide deposited to cause such troubles as clogging of pumps. According to this method, moreover, it was impossible to control the composition of the objective complex metal oxide. Thus, since the stable pH range differs depending on the kinds of metal ions, it is improper to react ammonia on aqueous solutions of metal salts other than Ni salts.

COMPARATIVE EXAMPLE 10

A mixed aqueous solution having a nickel sulfate concentration of 2 mol/l, a calcium nitrate concentration of 0.25 mol/l, a zinc sulfate concentration of 0.1 mol/l and a cobalt sulfate concentration of 0.05 mol/l was prepared. Then the mixed solution and a 4.8 mol/l aqueous ammonia solution were fed, while being kept at 50° C., each at an average rate of 0.5 ml/min into a 5-l reaction vessel 1, and while the inner temperature of the vessel being kept constant at 50° C. and with stirring to effect rapid and uniform mixing, a 4.8 mol/l aqueous sodium hydroxide solution was added at an average rate of 0.5 ml/min so as to keep the pH in the reaction vessel within the range of 12.5±0.2.

However, on mixing the above-mentioned metal salt solutions, $CaSO_4$ deposited and resultantly the intended Ni—Ca—Zn—Co complex metal oxide could not be obtained. Thus, the solubility and the reaction rate differ depending on the kinds of metal salts and hence it is improper to mix them beforehand. Therefore, for obtaining a complex metal oxide with a uniform composition, the respective aqueous metal salt solutions are preferably fed each independently such that the respective metal salts always have respectively a constant concentration in the reaction system.

In Examples 1–3, the aqueous alkali solution is preferably fed such that the amount of the alkali used is 1.9–2.3 moles relative to 1 mole of the total of Ni salts and metal salts other than Ni salts, and the aqueous solution containing ammonium ions is preferably fed proportionately such that the amount of ammonium ions used is 2 moles or more relative to 1 mole of the total of nickel salts and different kind metal salts. The pH of the reaction system is preferably 11–13, the temperature of the reaction system is preferably 30–60° C., and the residence time is preferably 20–50 hours.

The amount of different metal oxides to be incorporated into nickel oxide powder is preferably 0.5–20.0% by weight in order to obtain the excellent effect of improving characteristic properties and to obtain powders having an excellent uniform composition.

Under the conditions of reagent concentration ratio, pH, temperature, residence time, etc. described above, powder of composite oxide of a plurality of metal elements with a tap density of 1.9 g/cm$^3$ or more can be obtained and, when it is used for constructing electrodes, positive electrodes can be obtained which have the same level of filling density as positive electrodes which use conventional nickel oxide as the active material.

Metals other than Ni which are preferably used are at least one metal selected from Zn, Cd and Co, and at least one metal selected from Ca, Y, Ti, Sr, rare earth metals and Bi, which are expected mainly to improve high temperature charge efficiency, or selected from Mn, Al, V, Cr, Fe, Cu, Ge, Nb, Mo, Ag, W and Sn, which are expected mainly to improve the order of reaction.

EXAMPLE 4

With the object of obtaining active material particles formed of a plurality of metal oxide layers by making the content of metal salts other than nickel salts in the last reaction-deposition stage higher than that in the preceding reaction-deposition stage, and as a specific example, a process for producing a composite oxide of a plurality of metal elements wherein the inner layer comprises nickel hydroxide and the surface layer comprises nickel hydroxide containing calcium as solid solution is described below. The production apparatus is of the same structure as that shown in FIG. 2 comprising two reaction-deposition vessels 11 and 12 connected with each other, each having a volume of 5 l. First, a 2.4 mol/l aqueous nickel nitrate solution and a 4.8 mol/l aqueous ammonia solution were prepared. These solutions were simultaneously fed each at an average rate of 0.5 ml/min into the reaction vessel 11 and, while the inner temperature of the vessel being kept constant at 50° C. and with stirring to effect rapid and uniform mixing, a 4.8 mol/l aqueous sodium hydroxide solution was added at an average rate of 0.5 ml/min so as to keep the pH value in the reaction vessel within the range of 12.5±0.2. After the conditions in the reaction vessel had become stable, the resulting suspension containing nickel hydroxide particles grown to an average particle diameter of 12 μm was fed into the reaction vessel 12 at an average rate of 1.5 ml/min. Simultaneously with the suspension, a 2.2 mol/l aqueous nickel nitrate solution and a 0.2 mol/l aqueous calcium nitrate solution were fed each at an average rate of 0.5 ml/min into the reaction vessel 12 and, while the inner temperature of the vessel being kept at 50° C. and with stirring, a 4.8 mol/l aqueous sodium hydroxide solution was added at an average rate of 0.5 ml/min so as to keep the pH value in the reaction vessel within the range of 12±0.2. After the conditions in the reaction vessel had become stable, the suspension in the vessel was made to overflow from the upper part of the reaction vessel to collect samples continually. The suspension thus obtained was centrifuged, the supernatant liquid was replaced with deionized water, the resulting sediment was subjected to in-liquid classification to remove minute crystals of oxides comprising mainly Ni which had been formed in the reaction vessel 12 and contain Ca throughout the inside, and then washed with water and dried to obtain a powder with an average particle diameter of 12.5 μm.

For comparison, an example of conventional batch type production processes is described below. As the reaction apparatus were used the reaction vessels 11 and 12 shown in FIG. 2 independently from each other. First, in the same manner as described above, nickel hydroxide particles were grown to an average particle diameter of 12 μm in the reaction vessel 11 and the suspension was continuously taken out from the upper part of the reaction vessel by means of overflowing. The suspension thus obtained was centrifuged and the supernatant was replaced with deionized water. This water-washing operation was repeated several times, and the sediment was dried. A 100 g portion of the dry powder thus obtained was placed in the reaction vessel 12, then a 2.2 mol/l aqueous nickel nitrate solution, 0.2 mol/l aqueous calcium nitrate solution and 4.8 mol/l aqueous ammonia solution were simultaneously fed each at an average rate of 0.5 ml/min into the reaction vessel 12 and, while the temperature in the vessel being kept constant at 50° C. and with stirring, a 4.8 mol/l aqueous sodium hydroxide solution was added at an average rate of 0.5 ml/min so as to keep the pH value in the reaction vessel within the range of 12±0.2. After the lapse of 3 hours, the suspension in the reaction vessel was collected, subjected to in-liquid classification as described above to remove minute crystals of oxide comprising mainly Ni which had been formed in the reaction vessel 12 and contain Ca throughout the inside, and then washed with water and dried to obtain a powder with an average particle diameter of 12.5 μm.

Figure 3A:
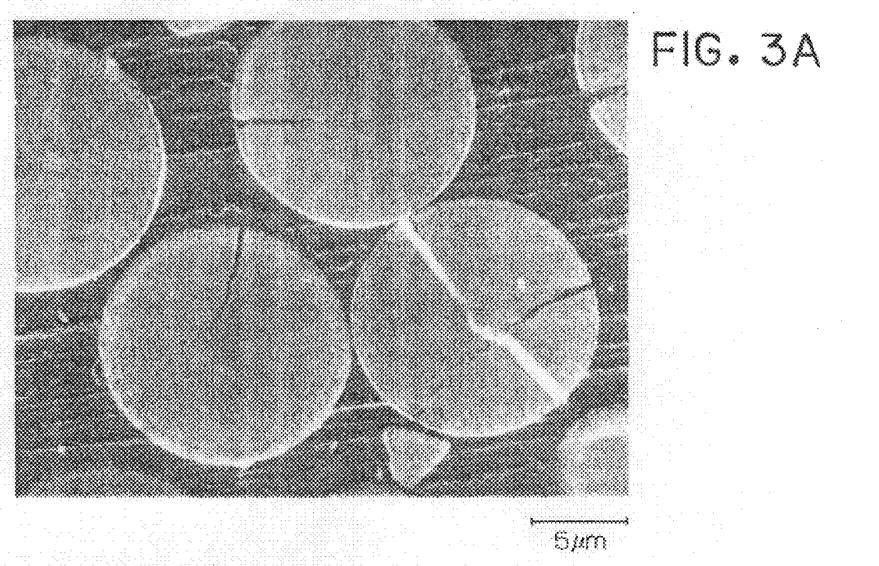
FIG. 3A is an electron photomicrograph showing the section of powder particles of the oxides of a plurality of metal elements of which the surface layer comprises nickel hydroxide containing Ca as solid solution and the inner layer comprises nickel hydroxide, obtained according to the process of the present invention, and a photograph obtained, correspondingly thereto, by observing the state of distribution of Ca by means of characteristic X-ray.
Figure 3B:
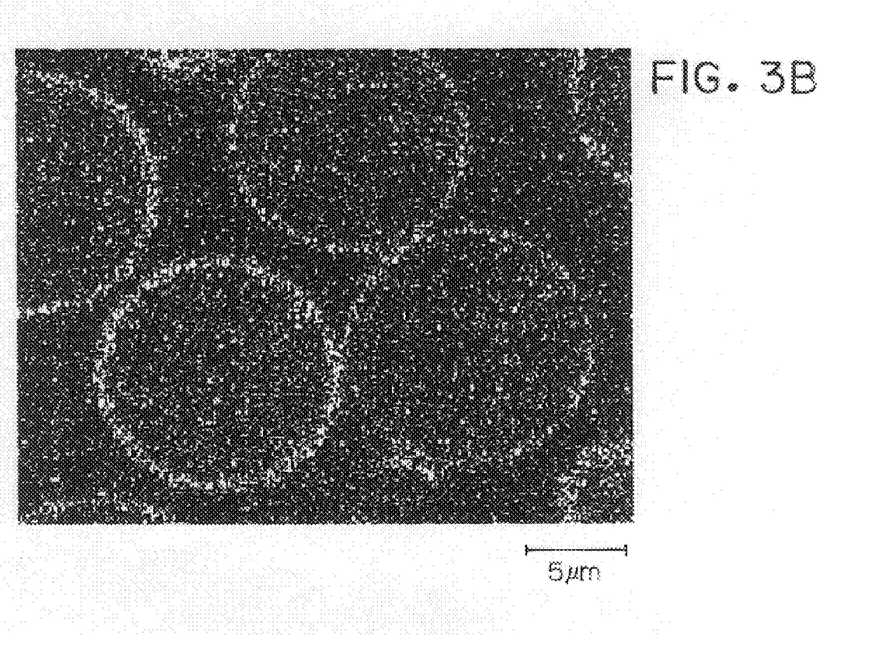
FIG. 3B is an electron photomicrograph which shows the presence of Ca at the parts indicated by white dots.

FIG. 3A and FIG. 3B show the characteristic X-ray image of the section of the complex metal oxide powder obtained according to the present invention as described above. FIG. 3A shows the SEM image of the section of the powder, and FIG. 3B shows the result of detecting the characteristic X-ray of Ca at the same position as in FIG. 3A, which shows the presence of Ca at the parts indicated by white dots. Thus, it can be observed that the surface layer and the inner layer are different in composition, much Ca being present in the surface layer of about 0.5 μm thickness. These results were found to agree approximately with the results of characteristic X-ray image and composition analysis of samples obtained by batch type processes. Thus, it has been revealed that samples similar to those obtained in the previous batch process can be obtained in the present invention. Further, approximately the same results were obtained also when the electrochemical characteristic properties of the two samples were evaluated.

Though description was given here of a case wherein, between the two reaction-deposition stages, Ca salts are contained in the latter stage in a larger amount than in the former stage, also in cases wherein the salt of at least one metal element selected from Ti, Sr, Y, Cr, rare earth metals and Bi is contained in a larger amount than in the former stage, oxide powders comprising mainly Ni which contain the above-mentioned metal element in a relatively large amount in the surface layer could be continuously obtained.

EXAMPLE 5

With the object of obtaining active material particles formed of a plurality of metal oxide layers by making the content of metal salts other than Ni salts in the reaction-deposition stage precedent to the last reaction-deposition stage higher than the content in the last stage, and as a specific example, a process for producing a composite oxide of a plurality of metal elements wherein the inner layer comprises nickel hydroxide containing manganese as solid solution and the surface layer comprises nickel hydroxide is described below. The production apparatus used is of the same structure as that shown in FIG. 2 comprising two reaction-deposition vessels 11 and 12 connected with each other, each having a volume of 5 l. First, a 2.2 mol/l aqueous nickel sulfate solution, a 0.2 mol/l aqueous manganese sulfate solution and a 4.8 mol/l aqueous ammonia solution were prepared. These solutions were simultaneously fed each at an average rate of 0.5 ml/min into the reaction vessel 11 and, while the inner temperature of the vessel being kept constant at 50° C. and with stirring to effect rapid and uniform mixing, a 4.8 mol/l aqueous sodium hydroxide solution was added so as to keep the pH value in the reaction vessel within the range of 12.0±0.2. After the conditions in the reaction vessel had become stable, the resulting suspension containing particles of nickel hydroxide containing manganese as solid solution grown to an average particle diameter of 12 μm was fed into the reaction vessel 12 at an average rate of 2.0 ml/min. Simultaneously with the suspension, a 2.4 mol/l aqueous nickel sulfate solution was fed at an average rate of 0.5 ml/min into the reaction vessel 12 and, while the inner temperature of the vessel being kept constant at 50° C. and with stirring, a 4.8 mol/l aqueous sodium hydroxide solution was added at an average rate of 0.5 ml/min so as to keep the pH value in the reaction vessel within the range of 12.5±0.2. After the conditions in the reaction vessel had become stable, the suspension in the vessel was made to overflow from the upper part of the reaction vessel to collect samples continually. The suspension thus obtained was centrifuged, the supernatant was replaced with deionized water, the resulting sediment was subjected to in-liquid classification to remove minute crystals of oxides comprising mainly Ni formed in the reaction vessel 12, and then washed with water and dried to obtain a powder with an average particle diameter of 12.5 μm.

For comparison, an example of conventional batch type production process is described below. As the reaction apparatus were used the reaction vessels 11 and 12 shown in FIG. 2 independently from each other. First, in the same manner as described above, particles of nickel hydroxide containing manganese as solid solution were grown to an average particle diameter of 12 μm in the reaction vessel 11, and the suspension was continuously taken out of the upper part of the reaction vessel by means of overflowing. The suspension thus obtained was centrifuged and the supernatant was replaced with deionized water. This water-washing operation was repeated several times, and the sediment was dried. A 100 g portion of the dry powder thus obtained was placed in the reaction vessel 12, then a 2.4 mol/l aqueous nickel sulfate solution and 4.8 mol/l aqueous ammonia solution were simultaneously fed each at an average rate of 0.5 ml/min into the reaction vessel 12 and, while the inner temperature of the vessel being kept constant at 50° C. and with stirring, a 4.8 mol/l aqueous sodium hydroxide solution was added at an average rate of 0.5 ml/min so as to keep the pH value in the reaction vessel within the range of 12.5±0.2. After the lapse of 3 hours, the suspension in the reaction vessel was collected, subjected to in-liquid classification in the same manner as described above to remove minute crystals of oxide comprising mainly Ni formed in the reaction vessel 12, and washed with water and dried to obtain a powder with an average particle diameter of 12.5 μm.

On comparing the characteristic X-ray image of the section of the complex metal oxide powder obtained according to the present invention as described above with that obtained by the prior process, it was observed that the powders were both different in composition between the surface layer and the inner layer, the surface layer about 0.5 μm in thickness comprising nickel hydroxide free from Mn. This result reveals that samples similar to those obtained in the previous batch process can also be obtained in the present invention. Further, approximately the same results were obtained also when the electrochemical characteristic properties of the two samples were evaluated.

Though description was given here of a case wherein the Mn salt is contained in a larger amount than in the last reaction-deposition stage, also in cases wherein salts of at least one metal element selected from Al, V, Cr, Fe, Cu, Ge, Nb, Mo, Ag, Sn and W are contained in a larger amount than in the last reaction-deposition stage, oxide powders comprising mainly nickel which contain the above-mentioned metal element in a relatively large amount in the inner layer could be obtained.

EXAMPLE 6

With the object of obtaining active material particles formed of a plurality of metal oxide layers by changing the kind of metal salts other than Ni salt in adjacent reaction-deposition stages, as a specific example, a process for producing oxides of a plurality of metal elements wherein the inner layer comprises nickel hydroxide containing manganese as solid solution and the surface layer comprises nickel hydroxide containing calcium as solid solution is described below. The reaction apparatus used was of the same structure as that shown in FIG. 2 comprising two reaction vessels 11 and 12 connected with each other, each having a volume of 5 l. First, a 2.2 mol/l aqueous nickel nitrate solution, 0.2 mol/l aqueous manganese nitrate solution and 4.8 mol/l aqueous ammonia solution were prepared. These solutions were simultaneously fed each at an average rate of 0.5 ml/min into the reaction vessel 11 and, while the inner temperature of the vessel being kept constant at 50° C. and with stirring to effect rapid and uniform mixing, a 4.8 mol/l aqueous sodium hydroxide solution was added at an average rate of 0.5 ml/min so as to keep the pH value in the reaction vessel within the range of 12.0±0.2. After the conditions in the reaction vessel had become stable, the suspension in the vessel containing particles of nickel hydroxide containing manganese as solid solution grown to an average particle diameter of 12 μm was fed at an average rate of 2.0 ml/min into the reaction vessel 12. Simultaneously with the suspension, a 2.2 mol/l aqueous nickel nitrate solution and 0.2 mol/l aqueous calcium nitrate solution were fed each at an average rate of 0.5 ml/l into the reaction vessel 12 and, while the inner temperature of the vessel being kept constant at 50° C. and with stirring, a 4.8 mol/l aqueous sodium hydroxide solution was added at an average rate of 0.5 ml/min so as to keep the pH value in the reaction vessel within the range of 12.0±0.2. After the conditions in the reaction vessel had become stable the suspension in the vessel was made to overflow from the upper part of the reaction vessel to collect samples continually. The suspension thus obtained was centrifuged, the supernatant was replace with deionized water, the resulting sediment was subjected to in-liquid classification to remove minute crystals of oxides comprising mainly Ni and containing Ca throughout the inside formed in the reaction vessel 12, and then washed with water and dried to obtain a powder with an average particle diameter of 12.5 μm.

For comparison, an example of conventional batch type production process is described below. As the production apparatus were used the reaction vessels 11 and 12 shown in FIG. 2 independently from each other. First, in the same manner as described above, particles of nickel hydroxide containing manganese as solid solution were grown to an average particle diameter of 12 μm in the reaction vessel 11, and the suspension was continuously taken out from the upper part of the reaction vessel by means of overflowing. The suspension thus obtained was centrifuged and the supernatant was replaced with deionized water. This water-washing operation was repeated several times and the sediment was dried. A 100 g portion of the dry powder thus obtained was placed in the reaction vessel 12, then a 2.2 mol/l aqueous nickel nitrate solution, 0.2 mol/l aqueous calcium nitrate solution and 4.8 mol/l aqueous ammonia solution were simultaneously fed each at an average rate of 0.5 ml/min into the reaction vessel 12 and, while the inner temperature of the vessel being kept constant at 50° C. and with stirring, a 4.8 mol/l aqueous sodium hydroxide solution was added at an average rate of 0.5 ml/min so as to keep the pH value in the reaction vessel within the range of 12.0±0.2. After the lapse of 3 hours the suspension in the reaction vessel was collected, subjected to in-liquid classification in the same manner as described above to remove minute crystals of oxides, formed in the reaction vessel 12, which comprised mainly Ni and contained Ca throughout the inside, and washed with water and dried to obtain a powder with an average particle diameter of 12.5 μm.

On comparing the characteristic X-ray image of the section of the complex metal oxide powder obtained according to the present invention as described above with that obtained by the prior process, it was observed that the powders were both different in composition between the surface layer and the inner layer, the surface layer about 0.5 μm in thickness containing a relatively large amount of Ca and the inner layer containing a relatively large amount of Mn. This result reveals that samples similar to those obtained in the prior batch process can also be obtained in the present invention. Further, approximately the same results were obtained also when the electrochemical characteristic properties of the two powders were evaluated.

Though description was given here of a case wherein the Ca salt is contained in a larger amount in the last reaction-deposition stage and the Mn salt is contained in a larger amount in the reaction-deposition stage precedent to the last stage, also in cases wherein salts of at least one metal element selected from Ti, Sr, Y, Cr, rare earth metals and Bi are contained in the last stage in a larger amount than in the precedent stage and salts of at least one metal element selected from Al, V, Cr, Fe, Cu, Ge, Nb, Mo, Ag, Sn and W are contained in the stage precedent to the last stage in a larger amount than in the last stage, oxide powders comprising mainly nickel which have different compositions between the surface layer and the inner layer could be obtained.

EXAMPLE 7

With the object of obtaining active material particles comprising a plurality of metal oxide layers by using 3 or more reaction-deposition vessels connected in series and changing the composition and/or kind of metal salts in respective reaction-deposition stages, and as a specific example, a process for producing a composite oxide of a plurality of metal elements of 3-layer structure wherein the inner layer comprises nickel hydroxide containing manganese as solid solution, the layer of the outside thereof comprises nickel hydroxide containing aluminum as solid solution and the outermost layer (surface layer) comprises nickel hydroxide containing calcium as solid solution is described below. The production apparatus used was of the same structure as that shown in FIG. 4 comprising three reaction-deposition vessels 28, 29 and 30 connected in series, each having a volume of 5 l. First, a 2.2 mol/l aqueous nickel nitrate solution, 0.2 mol/l aqueous manganese nitrate solution and 4.8 mol/l aqueous ammonia solution were prepared. These solutions were simultaneously fed each at a rate of 0.5 ml/min into the reaction vessel 28 and, while the inner temperature of the vessel being kept constant at 50° C. and with stirring to effect rapid and uniform mixing, a 4.8 mol/l aqueous sodium hydroxide solution was added at an average rate of 0.5 ml/min so as to keep the pH value in the reaction vessel within the range of 12.0±0.2. After the conditions in the reaction vessel had become stable, the suspension in the vessel containing particles of nickel hydroxide containing manganese as solid solution grown to an average particle diameter of 12 μm was fed at an average rate of 2.0 ml/min into the reaction vessel 29. Simultaneously with the suspension, a 2.2 mol/l aqueous nickel nitrate solution and 0.2 mol/l aqueous aluminum nitrate solution were fed each at an average rate of 0.5 ml/min into the reaction vessel 29 and, while the inner temperature of the vessel being kept constant at 50° C. and with stirring, a 4.8 mol/l aqueous sodium hydroxide solution was added at an average rate of 0.5 ml/min so as to keep the pH value in the reaction vessel within the range of 12.5±0.2. After the conditions in the reaction vessel had become stable, the suspension in the vessel containing particles having an inner layer comprising nickel hydroxide containing manganese as solid solution and a surface layer comprising nickel hydroxide containing aluminum as solid solution, grown to an average particle diameter of 12.5 μm, was fed at an average rate of 3.5 ml/min into the reaction vessel 30. Simultaneously with the suspension, a 2.2 mol/l aqueous nickel nitrate solution and 0.2 mol/l aqueous calcium nitrate solution were fed each at an average rate of 0.5 ml/min into the reaction vessel 30 and, while the inner temperature of the vessel being kept constant at 50° C. and with stirring, a 4.8 mol/l aqueous sodium hydroxide solution was added at an average rate of 0.5 ml/min so as to keep the pH value in the reaction vessel within the range of 12.0±0.2. After the conditions in the reaction vessel had become stable, the suspension in the reaction vessel was made to overflow from the upper part of the vessel to collect samples continually. The suspension thus obtained was centrifuged, the supernatant was replaced with deionized water, the resulting sediment was subjected to in-liquid classification to remove minute crystals of oxides comprising mainly Ni and containing Ca throughout the inside formed in the reaction vessel 30, and then washed with water and dried to obtain a powder with an average particle diameter of 12.7 µm.

For comparison, an example of conventional batch type production process is described below. The production apparatus used had a structure comprising the reaction vessels 28, 29 and 30 shown in FIG. 4 used each independently. First, in the same manner as described above, particles of nickel hydroxide containing manganese as solid solution were grown to an average particle diameter of 12 µm in the reaction vessel 28, and the suspension was continuously taken out from the upper part of the reaction vessel by means of overflowing. The suspension thus obtained was centrifuged and the supernatant was replaced with deionized water. This water-washing operation was repeated several times and then the sediment was dried. A 100 g portion of the dry powder thus obtained was placed in the reaction vessel 29, then a 2.2 mol/l aqueous nickel nitrate solution, 0.2 mol/l aqueous aluminum nitrate solution and 4.8 mol/l aqueous ammonia solution were simultaneously fed each at an average rate of 0.5 ml/min into the reaction vessel 29 and, while the inner temperature of the vessel being kept constant at 50° C. and with stirring, a 4.8 mol/l aqueous sodium hydroxide solution was added at an average rate of 0.5 ml/min so as to keep the pH value in the reaction vessel within the range of 12.5±0.2. After the lapse of 3 hours, the suspension in the reaction vessel was collected. The suspension thus obtained was centrifuged and the supernatant was replaced with deionized water. This water-washing operation was repeated several times and then the sediment was dried. A 100 g portion of the dry powder thus obtained was placed in the reaction vessel 30, then a 2.2 mol/l aqueous nickel nitrate solution, 0.2 mol/l aqueous calcium nitrate solution and 4.8 mol/l aqueous ammonia solution were simultaneously fed each at an average rate of 0.5 ml/min into the reaction vessel 30 and, while the inner temperature of the vessel being kept constant at 50° C. and with stirring, a 4.8 mol/l aqueous sodium hydroxide solution was added at an average rate of 0.5 ml/min so as to keep the pH in the reaction vessel within the range of 12.5±0.2. After the lapse of 3 hours the suspension in the reaction vessel was collected, subjected to in-liquid classification in the same manner as described above to remove minute crystals of oxides comprising mainly Ni and containing Ca throughout the inside formed in the reaction vessel 30, and the sediment was washed with water and dried to obtain a powder with an average particle diameter of 12.7 µm.

On comparing the characteristic X-ray image of the section of the complex metal oxide powder obtained according to the present invention as described above with that obtained by the prior process, it was observed that both powders had a 3-layer structure and had different compositions in the respective nickel hydroxide layers, the surface layer of about 0.2 µm thickness being rich in Ca, the intermediate layer of about 0.5 µm thickness being rich in Al and the inner layer being rich in Mn. This result reveals that samples similar to those obtained in the prior batch process can also be obtained in the present invention. Further, approximately the same results were obtained when the electrochemical characteristic properties of the two powders were evaluated.

Though description was given here of a case wherein the Ca salt is contained in a larger amount in the last reaction-deposition stage and the Al salt and Mn salt are contained in larger amounts in the precedent reaction-deposition stages, also in cases wherein salts of at least one metal element selected from Ti, Sr, Y, Cr, rare earth metals and Bi are contained in a larger amount in the last stage than in the precedent stages and, at the same time, salts of at least one metal element selected from V, Cr, Fe, Cu, Ge, Nb, Mo, Ag, Sn and W are contained in a larger amount in the precedent stages than in the last stage, oxide powders comprising mainly nickel and having a 3-layer structure, the respective layers being different in composition, could be similarly obtained.

Though the above example was described with a case wherein particles were grown through three reaction-deposition stages, oxide powders comprising a multi-layer structure in which the respective layers were different in composition were similarly obtained through reaction-deposition stages comprising more than three stages.

EXAMPLE 8

With the object of obtaining active material particles having a plurality of layers containing a plurality of metal elements in each layer by changing the kind of metal salts other than Ni salts in adjacent stages, and as a specific example, a process for producing a composite oxide of a plurality of metal elements wherein the inner layer comprises nickel hydroxide containing cobalt and manganese as solid solution and the surface layer comprises nickel hydroxide containing cobalt, zinc and calcium as solid solution is described below. The production apparatus used was of the same structure as that shown in FIG. 2 which comprised two reaction-deposition vessels 11 and 12 connected with each other, each having a volume of 5 l.

First, a 2.2 mol/l aqueous nickel nitrate solution, 0.05 mol/l aqueous cobalt nitrate solution, 0.15 mol/l manganese nitrate solution and 4.8 mol/l aqueous ammonia solution were prepared. These solutions were simultaneously fed each at an average rate of 0.5 ml/min into the reaction vessel 11 and, while the inner temperature of the vessel being kept constant at 50° C. and with stirring to effect rapid and uniform mixing, a 4.8 mol/l aqueous sodium hydroxide solution was added at an average rate of 0.5 ml/min so as to keep the pH value in the reaction vessel within the range of 12.0±0.2. After the conditions in the reaction vessel had become stable, the suspension in the vessel containing particles of nickel hydroxide containing cobalt and manganese as solid solution grown to an average particle diameter of 12 µm was fed at an average rate of 2.0 ml/min into the reaction vessel 12. Simultaneously with the suspension, a 2.2 mol/l aqueous nickel nitrate solution, 0.1 mol/l aqueous calcium nitrate solution, 0.05 mol/l aqueous zinc nitrate solution and 0.05 mol/l aqueous cobalt nitrate solution were fed each at an average rate of 0.5 ml/min into the reaction vessel 12 and, while the inner temperature of the vessel being kept constant at 50° C. and with stirring, a 4.8 mol/l aqueous sodium hydroxide solution was added at an average rate of 0.5 ml/min so as to keep the pH value in the reaction vessel within the range of 12.0±0.2. After the conditions in the reaction vessel had become stable, the suspension in the reaction vessel was made to overflow from the upper part of the vessel to collect samples continually. The suspension thus obtained was centrifuged, the supernatant was replaced with deionized water, the resulting sediment was subjected to in-liquid classification to remove minute crystals of oxides comprising mainly Ni and containing Ca, Zn and Co throughout the inside formed in the reaction vessel 12, and then washed with water and dried to obtain a powder with an average particle diameter of 12.5 µm.

For comparison, an example of conventional batch type production process is described below. The production apparatus had a structure comprising reaction vessels 11 and 12 shown in FIG. 2, used each particles of nickel hydroxide containing cobalt and manganese as solid solution were grown to an average particle diameter of 12 μm in the reaction vessel 11, and the suspension was continuously taken out from the upper part of the reaction vessel by means of overflowing. The suspension obtained was centrifuged and the supernatant was replaced with deionized water. This water-washing operation was repeated several times and the sediment was dried. A 100 g portion of the dry powder thus obtained was placed in the reaction vessel 12, then a 2.2 mol/l aqueous nickel nitrate solution, 0.1 mol/l aqueous calcium nitrate solution, 0.05 mol/l aqueous cobalt nitrate solution, 0.05 mol/l aqueous zinc nitrate solution and 4.8 mol/l aqueous ammonia solution were simultaneously fed each at an average rate of 0.5 ml/min into the reaction vessel 12 and, while the inner temperature of the vessel being kept constant at 50° C. and with stirring, a 4.8 mol/l aqueous sodium hydroxide solution was added at an average rate of 0.5 ml/min so as to keep the pH in the reaction vessel within the range of 12.0±0.2. After the lapse of 3 hours, the suspension in the reaction vessel was collected, subjected to in-liquid classification to remove minute crystals of oxides comprising mainly Ni and containing Ca, Co and Zn throughout the inside formed in the reaction vessel 12, and then washed with water and dried to obtain a powder with an average particle diameter of 12.5 μm.

The complex metal oxide powder of the present invention described above was measured for its tap density to show a high value of 2.0 g/cm$^3$. On comparing the characteristic X-ray image of the section of the powder of composite oxide of a plurality of metal elements obtained according to the present invention as described above with that obtained by the prior process, it was observed that the powders were both different in composition between the surface layer and the inner layer, the surface layer of a thickness of about 0.5 μm being rich in Ca, Co and Zn while the inner layer being rich in Co and Mn. This reveals that samples similar to those obtained by the prior batch type process can also be obtained in the present invention. Further, approximately the same results were obtained when the electrochemical characteristic properties of two powders were evaluated.

Though description was given here of a case wherein the Ca salt is contained in a relatively large amount in the last reaction-deposition stage and the Mn salt is contained in a relatively large amount in the stage precedent to the last stage, also in cases wherein salts of at least one metal element selected from Ti, Sr, Y, Cr, rare earth metals and Bi are contained in the last stage in a larger amount than in the precedent stage and, at the same time, salts of at least one metal element selected from Al, V, Cr, Fe, Cu, Ge, Nb, Mo, Ag, Sn and W are contained in the stage precedent to the last stage in a larger amount than in the last stage, oxide powders comprising mainly Ni and different in composition between the surface layer and the inner layer could similarly be obtained, and all showed a tap density of 1.9 g/cc or more.

As described in the above Examples, according to the present invention, active material particles formed of a plurality of metal oxide layers can be produced by using a plurality of reaction-deposition stages and changing the composition and/or kind of the salts of metal groups in the stages adjacent to each other. Further, since the production can be conducted continuously, mass productivity can be improved as compared with prior batch type processes.

As described above, according to the present invention, a complex metal oxide with a high density can be obtained by simultaneously feeding, with stirring, an aqueous nickel salt solution, aqueous solutions of different kinds of metals, aqueous solution containing ammonium ions and aqueous alkali metal hydroxide solution of predetermined concentration ratio into a reaction system controlled to have a predetermined constant pH and temperature, so as to give a predetermined residence time. When the complex metal oxide is used as the positive electrode material for an alkaline storage battery, a storage battery with increased capacity and improved characteristics as high temperature charge efficiency can be obtained.

Furthermore, by using a plurality of successive reaction-deposition vessels and changing the composition and/or kind of salts of a group of metals used for forming oxides in the reaction-deposition stages adjacent to each other, complex metal oxide particles comprising Ni as the main metal element and formed of a plurality of layers piled up from the center toward the surface of the particle can be group continuously, whereby the process steps can be greatly simplified and the mass productivity can be improved as compared with prior batch processes.

What is claimed is:

1. A process for producing positive electrode active material powder for alkaline storage batteries, said powder comprising complex metal oxide particles comprising Ni as a main metal element formed of a plurality of layers piled up from the particle's center toward its surface, said process comprising continuously growing said particles to a particle diameter of 2–100 μm through a plurality of successive reaction-deposition stages, and using different compositions of salts of a group of metals for forming the oxide in the reaction-deposition stages that are adjacent to each other, wherein said metals are selected from the group consisting of Ni, Co, Zn, Cd, Mn, Al, V, Cr, Fe, Cu, Ge, Nb, Mo, Ag, W, Sn, Ca, Y, Ti, Sr, rare earth metals and Bi.

2. A process for producing positive electrode active material powder for alkaline storage batteries according to claim 1 wherein one or more salts of at least one metal selected from the group consisting of Ca, Ti, Sr, Y, Cr, rare earth metals and Bi are contained, besides Ni, in a last stage of the plurality of successive reaction-deposition stages in a larger amount than in a precedent stage.

3. A process for producing positive electrode active material powder for alkaline storage batteries according to claim 2 wherein the complex metal oxide is eutectic and/or solid solution of the oxides of respective metals.

4. A process for producing positive electrode active material powder for alkaline storage batteries according to claim 1 wherein one or more salts of at least one metal selected from the group consisting of Al, V, Mn, Fe, Cu, Ge, Nb, Mo, Ag, Sn and W are contained, besides Ni, in at least one stage precedent to a last stage of the plurality of successive reaction-deposition stages in a larger amount than in the last stage.

5. A process for producing positive electrode active material powder for alkaline storage batteries according to claim 4, wherein the complex metal oxide is eutectic and/or solid solution of the oxides of respective metals.

6. A process for producing positive electrode active material powder for alkaline storage batteries according to claim 1 wherein the complex metal oxide is eutectic and/or solid solution of the oxides of respective metals.

7. A process for producing positive electrode active material powder for alkaline storage batteries according to claim 1, wherein the plurality of successive reaction deposition stages is connected by overflowing a reactant.

* * * * *